US012393258B1

(12) United States Patent
Bshara et al.

(10) Patent No.: US 12,393,258 B1
(45) Date of Patent: Aug. 19, 2025

(54) WAKE-UP MANAGEMENT CIRCUIT FOR MULTIPLE PROCESSORS

(71) Applicant: Amazon Technologies, Inc., Seattle, WA (US)

(72) Inventors: Said Bshara, Tira (IL); Dror Fleischmann, Ramat Gan (IL); Erez Izenberg, Tel Aviv-Jaffa (IL); Avigdor Segal, Netanya (IL); Guy Nakibly, Kedumim (IL); Jonathan Cohen, Hod Hasharon (IL)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 18/194,287

(22) Filed: Mar. 31, 2023

(51) Int. Cl.
*G06F 1/3296* (2019.01)
*G06F 1/3234* (2019.01)

(52) U.S. Cl.
CPC .......... *G06F 1/3296* (2013.01); *G06F 1/3278* (2013.01)

(58) Field of Classification Search
CPC .............................. G06F 1/3296; G06F 1/3278
See application file for complete search history.

(56) References Cited

U.S. PATENT DOCUMENTS

| 7,770,044 | B2 | 8/2010 | Bibikar |
| 8,286,011 | B2 | 10/2012 | Satsangi |
| 8,392,728 | B2 | 3/2013 | Hacking |
| 10,318,311 | B2 | 6/2019 | Dresden et al. |
| 10,915,160 | B2 | 2/2021 | Dalal |
| 11,068,277 | B2 | 7/2021 | Dresden et al. |
| 11,113,046 | B1 | 9/2021 | Bowen et al. |
| 11,243,589 | B1 | 2/2022 | Bowen et al. |
| 2020/0150745 | A1* | 5/2020 | Dalal .................... G06F 1/3231 |
| 2022/0057854 | A1* | 2/2022 | Karanje ................ G06F 1/3209 |

OTHER PUBLICATIONS

U.S. Appl. No. 16/581,651, filed Sep. 24, 2019, Bowen, et al.

\* cited by examiner

*Primary Examiner* — Terrell S Johnson
(74) *Attorney, Agent, or Firm* — Alexander A. Knapp; Kowert, Hood, Munyon, Rankin & Goetzel, P.C.

(57) ABSTRACT

A wake-up management circuit for implementation in circuit boards with multiple processors is disclosed. The wake-up management circuit utilizes hardware resources to generate a wake-up signal for a processor in a low power mode when traffic intended for the processor is received by the wake-up management circuit. The wake-up management circuit is configured to generate a wake-up signal for a specific processor when address information in a data packet received by the wake-up management circuit indicates that the data packet is intended for the specific processor (e.g., the specific processor is the destination for the data packet).

20 Claims, 5 Drawing Sheets

WAKE-UP MANAGEMENT CIRCUIT FOR MULTIPLE PROCESSORS

BACKGROUND

Various improvements in processor technology have given rise to the implementation of multiple processors (e.g., central processing units (CPUs) or CPU cores) on a single circuit board (or card). The implementation of multiple processors on a single circuit board provides benefits for utilization of the circuit boards in a variety of technologies. One example of a technology is virtualization technology where a single physical virtualization host (e.g., a single circuit board) can be shared among multiple users and each user may be provided with one or more compute instances (such as "guest" virtual machines) hosted by the single virtualization host. With the implementation of multiple processors on a single circuit board, efficiency in energy and resource utilization become more important to the overall cost of operating such technology. One method that may be implemented to conserve energy and resource utilization is to allow processors to idle or enter "wait for event" (WFE) states when the processors are not in use. With processors placed in idle or WFE states, various methodologies are necessary to provide efficient and low latency techniques for waking up the idle processors.

Figure 1:
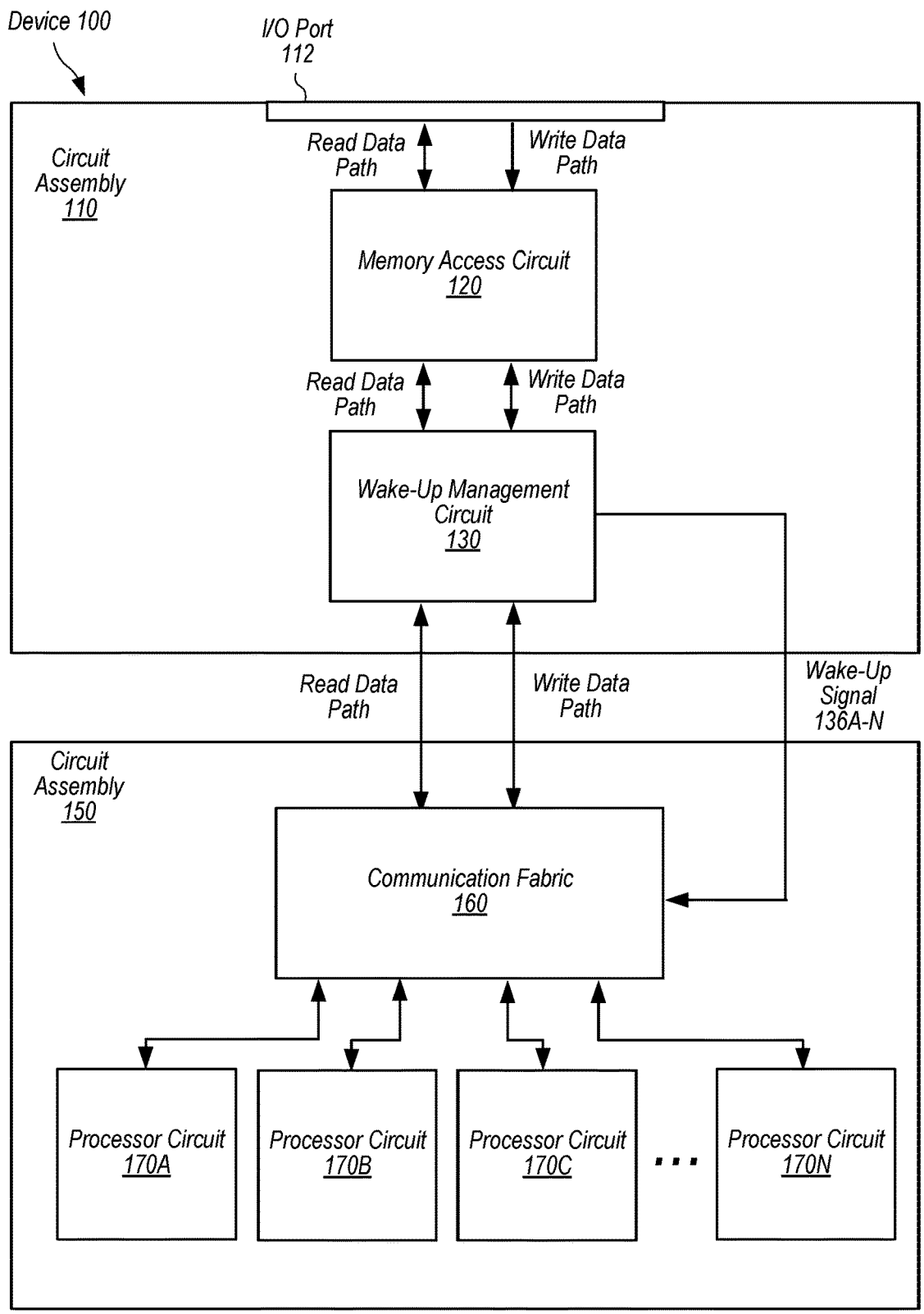
FIG. 1 depicts an example device implementing a wake-up management circuit in combination with multiple processor circuits, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

The present disclosure relates to apparatus and methods for providing wake-up instructions to various processors (e.g., central processor units (CPUs)) utilizing primarily hardware resources in integrated circuit devices when traffic activity is directed to the processors after the processors enter a low power (e.g., low activity) mode. Processors (e.g., CPUs) may be placed in a low power mode when there is no activity associated with the processors for a certain period of time. Such a low power mode may sometimes be referred to as a "wait for event (WFE)" state or an idle state. In the low power mode, processors have minimum operations to conserve power and resources.

In various embodiments, a processor is placed in the low power mode when no traffic (e.g., network traffic) is forwarded to the processor for a certain period of time. In some embodiments, a processor is placed in the low power mode when the processor is not associated with a user (e.g., the processor is part of a server group and is not associated with any user served by the server group). Once a processor is in low power mode (e.g., in WFE state), the processor remains idle until the processor is told to "wake-up" by a software or hardware signal. The processor needs to wake-up in order to be ready for further activity (e.g., to receive further traffic). Thus, ideally a processor should be woken-up prior to any traffic being received by the processor.

One approach for waking up a processor is a software-based approach. In this approach, the processor is programmed to wake-up periodically (e.g., at predetermined time intervals) and check for any new activity (e.g., whether any traffic is incoming or a new user device has been added). In the software-based approach, the software operates a polling loop over all relevant buffers (e.g., all rings) to determine whether there is any activity. This software-based approach suffers, however, from high latency issues due to the need to wait for polling at the predetermined time interval (thus also possibly missing the beginning of traffic activity) and the polling process having to operate over all information stored in all the buffers. Additionally, energy usage is not necessarily fully minimized by software since processors are turned on at regular intervals to conduct the polling for activity.

The issues with the software-based approach may also be more problematic when implemented on circuit boards (or die) with multiple processors. On such boards, the multiple processors may receive traffic from different sources through a single, network data port (e.g., input/output (I/O) port) and a communication fabric, as described herein. While traffic is received by the circuit board through the single pathway, with the software-based approach, each processor (when in a WFE state) has to conduct its own polling of buffers to determine whether activity is directed to that processor. With each processor having to conduct its own polling, energy savings may not be fully realized and latency can be further problematic.

To overcome many of the issues with the software-based approach, the present disclosure contemplates the implementation of a hardware circuit (e.g., a wake-up management circuit) to provide wake-up services to processors. Various approaches are contemplated that implement wake-up management circuits to detect activity (e.g., transaction traffic or data packets) intended for processors currently in a WFE state and provide wake-up signals to the processors. The wake-up management circuit may be implemented in a communication pathway between a network data port and the processors to monitor traffic from all traffic sources. The hardware-based approach using the wake-up management circuit described herein reduces the need for the processors to be preemptively woken and conduct their own polling of buffers or traffic sources.

The wake-up management circuit approach in the present disclosure may be implemented through the addition of various circuit elements with some initial software programming of the hardware. The wake-up management circuit approach provides low latency wake-up processes for processors that switch between low power (a WFE state) and active modes (e.g., active read/writing). This hardware-based approach provides fast wake-up of the processors without software intervention during the wake-up process and allows wake-ups for multiple processors on a circuit board to be handled by a single, wake-up management circuit implemented on the circuit board or die (or another circuit board directly coupled to the circuit board or the die with the processors). In some instances, the wake-up management circuit is capable of providing information on the source of the activity causing the wake-up of the processor. It should be understood that while the present disclosure refers to one or more circuit components being placed on a circuit board, the circuit components may also be supported using another type of support structure including, but not limited to, a die, a substrate, and a package. Any such support structure for the circuit components may be utilized while the circuit components remain within the scope of the present disclosure.

Figure 6:
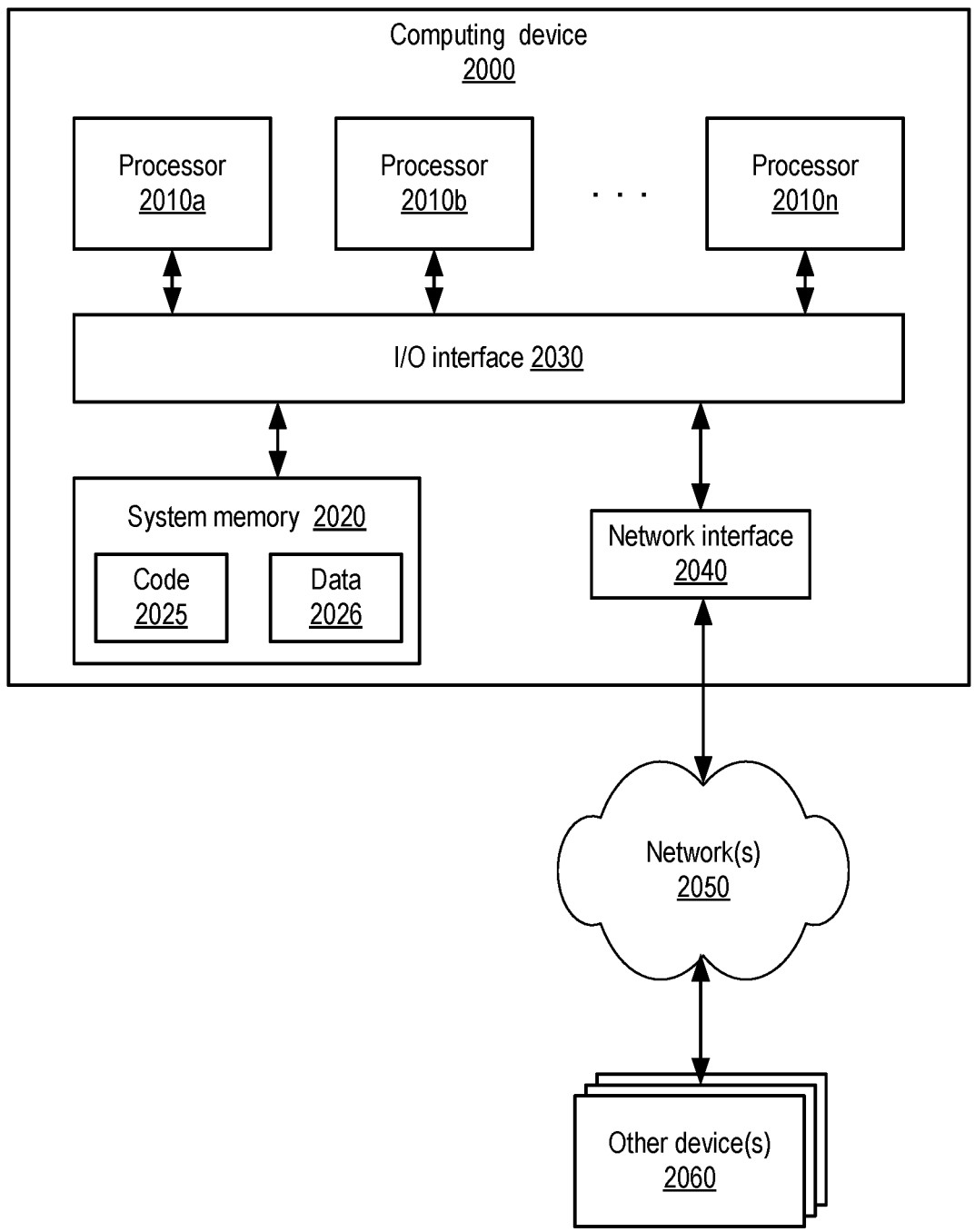
FIG. 6 is a block diagram illustrating an example computing device that may be used in at least some embodiments.

FIG. 1 depicts an example device implementing a wake-up management circuit in combination with multiple processor circuits, according to some embodiments. In certain embodiments, device 100 is a circuit board (or card) with one or more circuit assemblies (e.g., circuit assembly 110 and circuit assembly 150) attached to or formed on the circuit board. For instance, device 100 may be a printed circuit board with circuit assembly 110 and circuit assembly 150 coupled to connections on the printed circuit board. Device 100 may have other structures suitable for including and supporting one or more circuits. For example, device 100 may include multiple circuit boards coupled together (e.g., circuit assembly 110 is on a first circuit board and circuit assembly 150 is on a second circuit board with the first circuit board coupled to the second circuit board). Another example of device 100 is shown in FIG. 6, which is described in more detail below.

In the illustrated embodiment, device 100 includes circuit assembly 110 coupled to circuit assembly 150. Circuit assembly 110 and circuit assembly 150 may alternatively, be separate circuit assemblies of the same circuit assembly. In various embodiments, circuit assembly 110 is a southbridge chip circuit assembly and circuit 150 is a northbridge chip circuit assembly. For instance, circuit assembly 110 may handle input/output (I/O) functions for device 100 while circuit assembly 150 handles primary operations (e.g., processing or memory operations) of the device.

In certain embodiments, circuit assembly 110 includes I/O port 112. I/O port 112 is a network data port for device 100. In some embodiments, I/O port 112 may be, as shown in FIG. 1, a riser or board connectable to other devices. I/O port 112 may, however, be any type of network data port capable of network-based input and/or output communication with another device. Examples of other types of network data ports include, but are not limited to, RJ45 ports, USB ports, PCIe ports, HDMI ports, SATA ports, and SFP ports.

In various embodiments, network transaction traffic (e.g., data packets) sent through I/O port 112 is communicated to memory access circuit 120. Data packets may include headers and data content associated with either write or read instructions for processor circuits 170. For example, write data packets may include headers and data content for writing to processor circuits 170 while read data packets may include headers and instructions for reading data content from the processor circuits. Memory access circuit 120 may be configured to manage data transfer operations (such as memory read/write operations) in device 100. Memory access circuit 120 may be, for example, a memory access engine such as a direct memory access (DMA) engine or other controller responsible for managing data transfer operations in device 100. It should be understood that circuit assembly 110 may include other components in addition to those described in this disclosure. Such other components may have contributions to the operation of device 100, circuit assembly 110, and components of the circuit assembly but are not described herein for simplicity in the present disclosure.

In certain embodiments, circuit assembly 110 includes wake-up management circuit 130. Wake-up management circuit 130 may be positioned in the data read/write path between memory access circuit 120 and communication fabric 160 in circuit assembly 150, as shown in FIG. 1. Wake-up management circuit 130 may manage monitoring of the data read/write paths for generating wake-up signal 136, as described herein. Wake-up management circuit 130 is described in further detail below with respect to illustrations of FIGS. 2 and 3.

In the illustrated embodiment, circuit assembly 150 includes communication fabric 160 and processor circuits 170. Communication fabric 160 may operate to handle routing for communications between circuit assembly 110 and processor circuits 170. For instance, communication fabric 160 may receive data packets and/or wake-up signal 136 and route the data packets and/or wake-up signal to the appropriate processor circuit 170. Communication fabric 160 may route data packets and/or wake-up signals based on information contained within the data packets or signals (e.g., header information or other information identifying the destination processor circuit).

In certain embodiments, circuit assembly 150 includes multiple processor circuits 170A-N. The total number (N) of processor circuits 170 may vary depending on the operational capabilities and operational needs of device 100. Processor circuits 170 may be, for example, central processing units (CPUs), CPU cores, or combinations thereof. In some embodiments, processor circuits 170 may be contained in one or more SoCs (system-on-chips) present in circuit assembly 150. Each SoC may include any number of processor circuits 170 and the number of processor circuits in each SoC may be different.

In the context of this disclosure, one or more of processor circuits 170A-N are capable of switching (e.g., cycling) between a low power mode (e.g., a WFE state) and an active mode. Processor circuits 170 may enter the lower power mode based on various parameters. For example, a processor circuit 170 may enter the low power mode when there is no data traffic (e.g., read/write traffic) to the processor circuit for a predetermined time period. In some instances, as described above, a processor circuit 170 may enter the low power mode when the processor circuit is not associated with a user device (e.g., the processor circuit is not connected to a user device via the network). In various embodiments, each processor circuit 170A-N independently determines whether to enter its own low power mode (e.g., a processor circuit operates independently of the status of other processor circuits). In some embodiments, a group of processor circuits 170 may enter the low power mode together (e.g., the group of processor circuits are tied together in an operational capacity).

Figure 2:
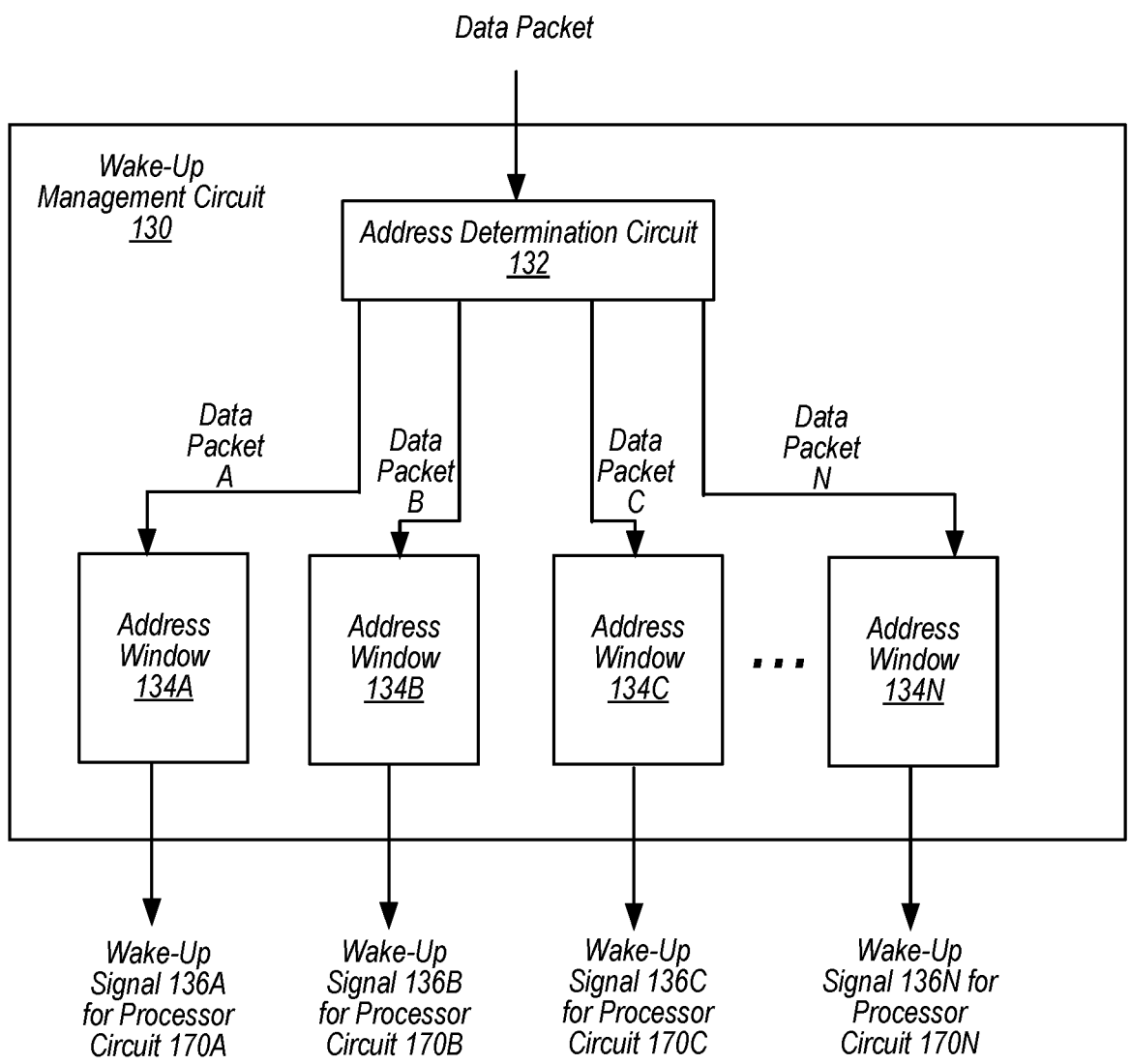
FIG. 2 depicts an example wake-up management circuit, according to some embodiments.

FIG. 2 depicts an example wake-up management circuit, according to some embodiments. In the illustrated embodiment, wake-up management circuit 130 includes address determination circuit 132 and address windows 134A-N. In certain embodiments, the total number (N) of address windows 134 corresponds to the total number (N) of processor circuits 170 (shown in FIG. 1) on device 100. Thus, there may be a 1:1 ratio of address windows 134 and processor circuits 170 with one address window corresponding to one processor circuit (e.g., address window 134A corresponds to processor circuit 170A, address window 134B corresponds to processor circuit 170B, etc.). In various embodiments, software programming may be implemented to setup address windows 134 in wake-up management circuit 130. It should be noted, however, that software programming may be necessary only for initial setup of address windows 134 and that the address windows may operate without software intervention during operation of device 100.

Some embodiments may contemplate multiple address windows corresponding to a single processor circuit. For example, address window 134A may include multiple address windows that correspond to processor circuit 170A. Multiple address windows corresponding to a single processor circuit may be utilized in instances where different types of data packet communications and/or different sources of data packets are possible. In such instances, multiple address windows corresponding to a single processor circuit may be utilized to provide different address windows for different types of data packet communications and/or different sources of data packets. As a specific example, address window 134A may include four different address windows—a first address window for ethernet-based communications, a second address window for packet-processing communications, a third address window for logger communications, and a fourth address window for push packet communications. Other address windows may be generated if additional types or sources of data packets are present in device 100.

In certain embodiments, an address window 134 includes a group (or range) of addresses (e.g., destination addresses) that are associated with the processor circuit 170 that corresponds to the address window. For instance, address window 134A includes a group of destination addresses that are associated with processor circuit 170A, address window 134B includes a group of destination addresses that are associated with processor circuit 170B, etc. The groups of addresses associated with each address window 134A-N may be known by address determination circuit 132. For example, the groups of addresses associated with each address window 134A-N may be programmed into address determination circuit 132 during initial setup of device 100. As with other software programming of wake-up management circuit 130, the programming of address determination circuit 132 may be only during setup of device 100 and the address determination circuit 132 operates without software intervention during operation of device 100.

With the programming of groups of addresses and corresponding address windows into address determination circuit 132, during operation of device 100, address determination circuit 132 may receive a data packet and route the data packet to the correct address window 134A-N based on the address (e.g., destination address) in the data packet. In some embodiments, the destination of the data packet may be determined from address most significant bits (MSBs) or AxUser bits. For instance, the address MSBs or AxUser bits may indicate an identification of the destination processor circuit 170 for the data packet and address determination circuit 132 can route the data packet to the appropriate address window 134 according to the destination processor circuit. MSBs or AxUser bits may also be used to identify a source of the data packet (e.g., the wake-up trigger), as described herein.

In response to receiving a data packet (or a beginning of the data packet such as the header), an address window 134 may generate a wake-up signal for its corresponding processor circuit 170. For example, if the received data packet has a destination address associated with processor circuit 170A, address determination circuit 132 will route the data packet (e.g., "data packet A") to address window 134A. Address window 134A may then generate a wake-up signal (e.g., wake-up signal 136A) that is intended for processor circuit 170A in response to receiving the data packet A.

Turning back to FIG. 1, the wake-up signal 136 is provided by wake-up management circuit 130 to communication fabric 160. In certain embodiments, as illustrated in FIG. 1, wake-up signal 136 is provided to communication fabric 160 independent of the read/write data paths. Thus, in order for wake-up signal 136 to be routed to the correct processor circuit 170A-N by communication fabric 160, the wake-up signal needs some indication of the processor circuit for which the wake-up signal is intended. Accordingly, in various embodiments, the wake-up signal 136 includes information identifying the destination of the wake-up signal (e.g., wake-up signal 136A includes information identifying processor circuit 170A as the intended destination of the wake-up signal). The identifying information may be, for example, destination address information associated with a processor circuit 170 added to the wake-up signal by its corresponding address window 134 (e.g., address window 134A adds destination address information for processor circuit 170A to wake-up signal 136A).

It should be noted that wake-up signal 136 may be transmitted by wake-up management circuit 130 to communication fabric 160 while the data packet itself is independently being transmitted to the communication fabric (through the wake-up management circuit, as shown in FIG. 1). In some embodiments, the address received in wake-up management circuit 130 may be in a header of the data packet. Often, the header may be received before completion of reception of the data packet in memory access circuit 120 or communication fabric 160 (e.g., before reception of the full data packet in the data packet). In such embodiments, wake-up signal 136 may be received by the processor circuit 170 that is to be woken up before completion of the data packet at the processor circuit. Accordingly, the implementation of wake-up management circuit 130 to provide wake-up signals for processor circuits may allow for fast waking up of processor circuits even before data completion. Additionally, as indicated above, a processor circuit may receive a wake-up signal when an address window 134 receives a data packet from a logger circuit (e.g., a logger transaction is received).

In some embodiments, wake-up signal 136 may be appended with other information useful for the intended processor circuit 170. For example, wake-up signal 136 may include information that identifies a source of the data packet causing the wake-up signal. The source of the data packet may be determined by address determination circuit 132 and/or address window 134. For instance, either address determination circuit 132 and/or address window 134 may be configured (through hardware, software, or a combination thereof) to identify a source address in the data packet. Address window 134 may then add the identification of the source of the data packet to wake-up signal 136. Identification of the source of the data packet may include, for example, adding of address information using most significant bits (MSBs) or AxUser bits to indicate the source.

The embodiment of wake-up management circuit 130 depicted in FIG. 2 and implemented in FIG. 1 provides a hardware-based solution for generating wake-up signals for processor circuits that are in low power mode. The hardware-based solution provided by wake-up management circuit 130 provides a low latency solution for generating wake-up signals without the need for software intervention to generate the wake-up signals (beyond initial programming of the wake-up management circuit). While the embodiments above describe a specific address window 134 generating a wake-up signal for its corresponding processor circuit (e.g., address window 134A generates wake-up signal 136A for processor circuit 170A), some embodiments may be contemplated where an address window generates a wake-up signal for multiple processor circuits or all processors. For instance, address window 134B may be configured (e.g., designed or programmed) to generate a wake-up signal for a select group of processor circuits (e.g., processor circuits 170B and 170C) or all the processor circuits in circuit assembly 150.

In some embodiments, address windows 134 may be configured to have a time delay between generating wake-up signals. For instance, it may be known that a processor circuit 170 will stay awake for at least a specific period of time. Any additional wake-up signals sent during the specific period would simply be cumulative to the initial wake-up signal received by the processor circuit and could potentially overload the processor circuit. Accordingly, address windows 134 may be configured to add a time delay between sending of consecutive wake-up signals 136 to the same processor circuit 170. The time delay may be on the order of a few milliseconds or some other time based on typical activity periods of the processor circuits.

Figure 3:
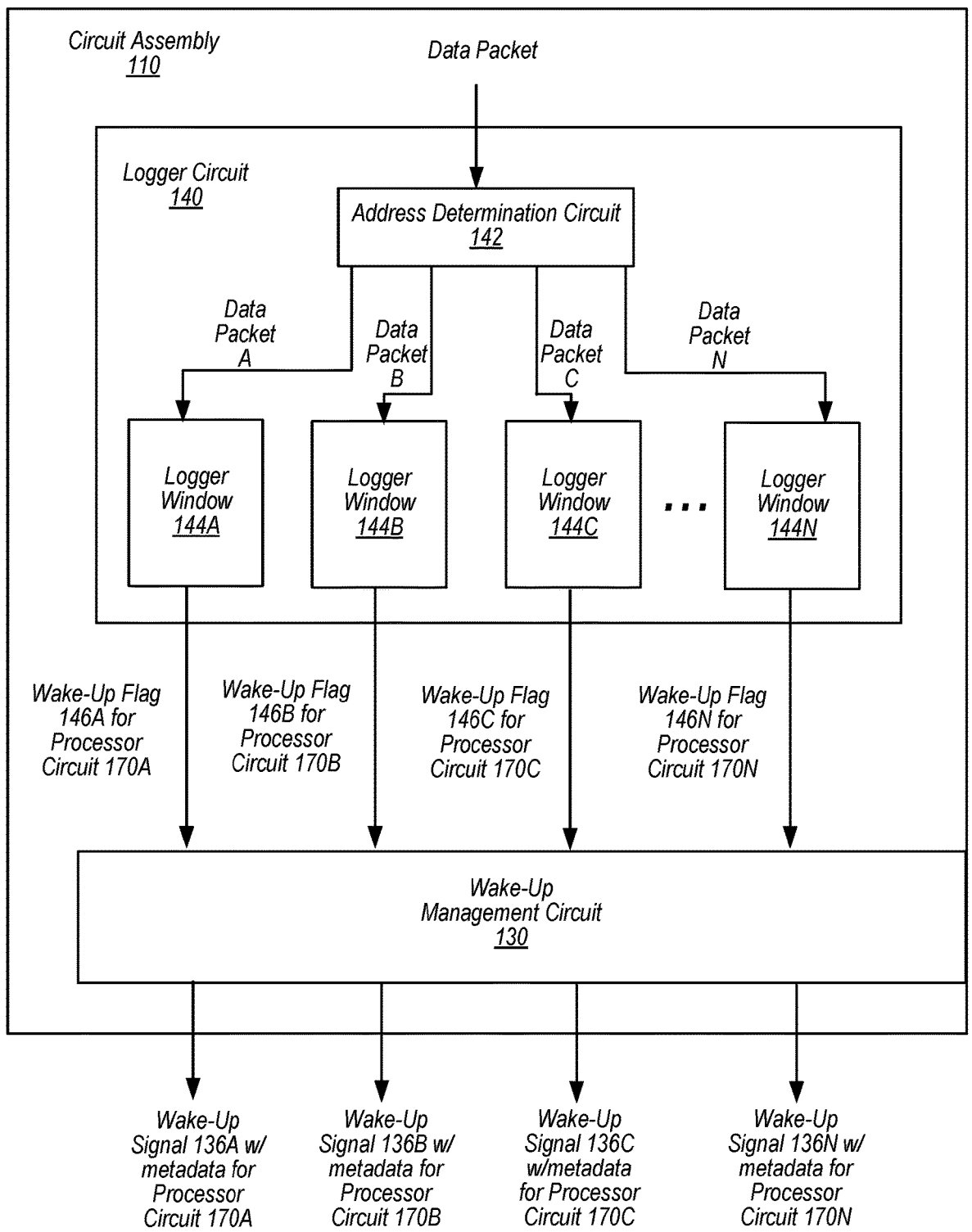
FIG. 3 depicts an example implementation of a wake-up management circuit with a logger circuit, according to some embodiments.

FIG. 3 depicts an example implementation of a wake-up management circuit with a logger circuit, according to some embodiments. In the illustrated embodiment, circuit assembly 110 includes logger circuit 140 coupled to wake-up management circuit 130. Logger circuit 140 may, in some embodiments, be part of memory access circuit 120 (shown in FIG. 1). Logger circuit 140 may also be an independent circuit inside circuit assembly 110. In some contemplated embodiments, logger circuit 140 may be part of a networking manager or a storage manager in circuit assembly 110. Logger circuit 140 may include various components intended for logging of transactions (e.g., reading/writing of data packets) as well as log transformations of data in the data packets. These components are not depicted in the current disclosure for simplicity in the drawings.

In the illustrated embodiment, logger circuit 140 includes address determination circuit 142 and logger windows 144. In various embodiments, logger windows 144 that are available as part of the logging functionality of the logger circuit. Logger windows 144 may be configured to receive log information associated with various destination addresses associated with processor circuits 170. Thus, similar to the implementation of address windows 134, shown in FIG. 2, logger windows 144A-N may include a group (or range) of addresses (e.g., destination addresses) that are associated with the processor circuit 170 that corresponds to the logger window. For example, logger window 144A includes a group of destination addresses that are associated with processor circuit 170A, etc.

In various embodiments, address determination circuit 142 operates to provide the data packet to the appropriate logger window 144 based on the destination address in the data packet. For instance, if the data packet includes a destination address associated with processor circuit 170B, address determination circuit 142 routes the data packet (as "data packet B") to logger window 144B. In response to receiving the data packets, logger windows 144 may provide corresponding wake-up flags 146 to wake-up management circuit 130. For example, logger window 144A provides wake-up flag 146A, logger window 144B provides wake-up flag 146B, logger window 144C provides wake-up flag 146C, etc.

In various embodiments, wake-up management circuit 130 is configured to generate a wake-up signal 136 in response to receiving wake-up flag 146 from logger circuit 140. Wake-up management circuit 130 generates a wake-up signal 136 that corresponds to the wake-up flag 146 received. For example, wake-up signal 136A is generated in response to receiving wake-up flag 146A. In certain embodiments, wake-up management circuit 130 generates metadata for the wake-up signal 136. The wake-up signal metadata may include information (e.g., destination address information) about the intended processor circuit 170 for the wake-up signal. In some embodiments, the wake-up signal metadata generated by wake-up management circuit is appended to (e.g., added to) the data packet being sent to communication fabric 160 for routing to the appropriate processor circuit 170. In certain embodiments, the metadata is added to a header packet of the data packet in order to expedite the wake-up of the processor circuit 170 (e.g., wake-up the processor circuit before completion of the data packet).

In some embodiments, the metadata may be part of a separate wake-up signal (e.g., wake-up signal 136) sent to communication fabric 160 for routing to the appropriate processor circuit 170. In various embodiments, the metadata generated by wake-up management circuit 130 includes information identifying the source of the data packet (e.g., the source of the traffic causing wake-up of the destination processor circuit 170). The information identifying the source may be the source address (e.g., triggering address), some part of the source address, or other address information (such as most significant bits (MSBs) or AxUser bits) used to identify the source.

Figure 4:
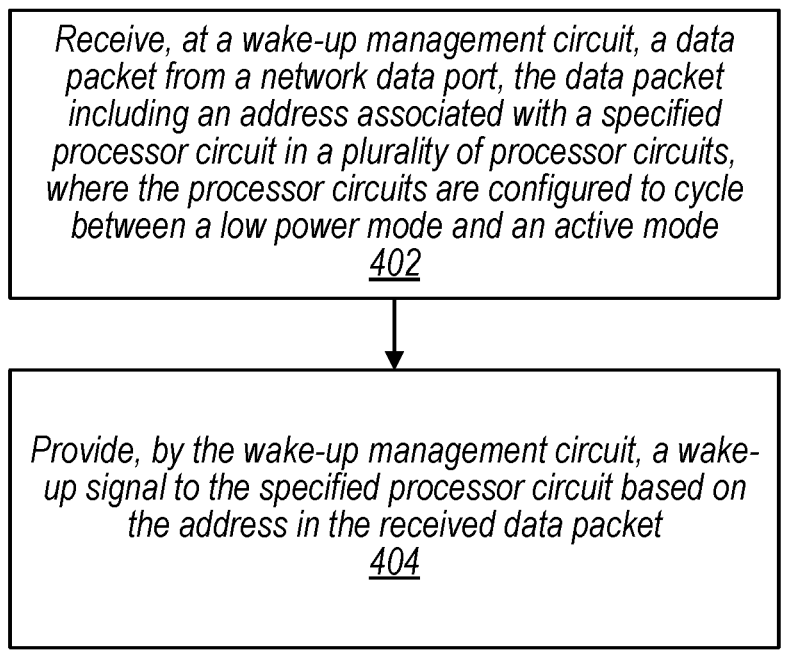
FIG. 4 is a flow diagram illustrating operations that may be performed by a device to generate a wake-up signal for processor circuits located on the device, according to some embodiments.

FIG. 4 is a flow diagram illustrating operations that may be performed by a device to generate a wake-up signal for processor circuits located on the device, according to some embodiments.

At 1402, the device receives, at a wake-up management circuit, a data packet from a network data port, the data packet including an address associated with a specified processor circuit in a plurality of processor circuits, where the processor circuits are configured to cycle between a low power mode and an active mode.

At 1404, the device provides, by the wake-up management circuit, a wake-up signal to the specified processor circuit based on the address in the received data packet.

Figure 5:
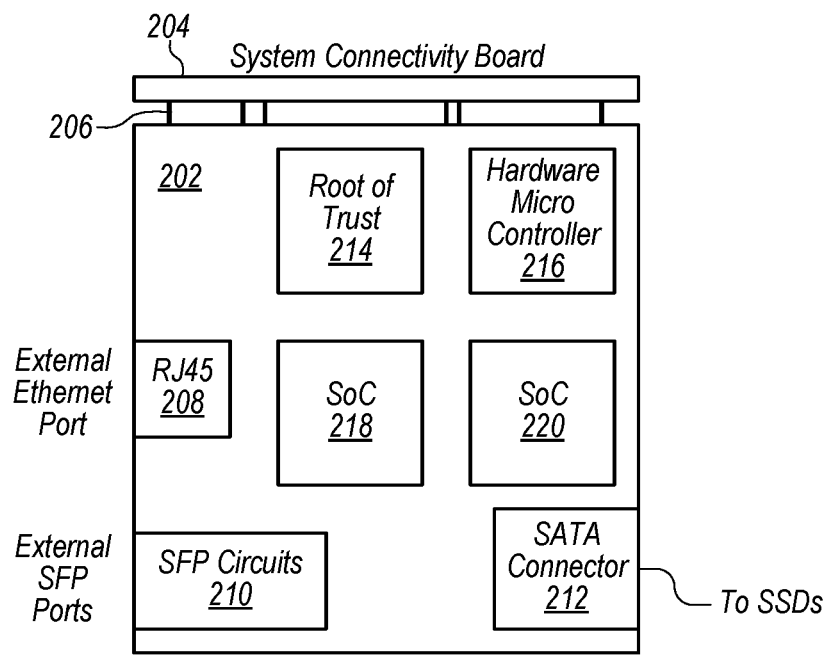
FIG. 5 illustrates an example circuit board for implantation of device 100, according to some embodiments.

FIG. 5 illustrates an example circuit board for implantation of device 100, according to some embodiments. In some embodiments, device 100 includes circuit board 202. Circuit board 202 may be, for example, a visualization offloading card that may function as a bridge between a pre-assembled computer system and a cloud computing service. For example, circuit board 202 may be a PCIe connected device (e.g. via Thunderbolt 3) and a USB connected device (e.g. via USB 3) which connects an unmodified third-party pre-assembled computer system to a substrate network of a cloud computing service. Also, the circuit board 202 may provide control interfaces between the cloud computing service and the virtualization host (e.g. a third-party pre-assembled computer system). The circuit board 202 may present non-volatile memory express (NVMe) and elastic network adaptors (ENA) over PCIe connections, such as via Thunderbolt connectors and controllers, and HID Keyboard and CDC ACM (e.g. a communications data class abstract control model protocol) over USB 3 to the third-party pre-assembled computer system.

Circuit board 202 includes connectors 206 that connect circuit board 202 to system connectivity board 204. In some embodiments, connectors 206 may include connectors for power and multi-pin connectors that extend PCIe communications to the circuit board 202. In some embodiments, other types of connectors may be used. For example, in some embodiments, connectors 206 may include a power connector, a 140 position edge connector and another 168 position edge connector configured to couple with corresponding connectors of the system connectivity board 204. In addition, circuit board 202 includes external Ethernet (RJ45) connector 208 and small form-factor port (SFP) and circuitry 210. Additionally, as discussed above, circuit board 202 includes a SATA connector 212 to connect the circuit board 202 to SSDs 114. Additionally, circuit board 202 includes root of trust component 214, hardware microcontroller 216 and systems on a chip (SoCs) 218 and 220.

The circuit board 202 may include one or more processors/cores 218/220 as well as one or more memories (not shown). The term "virtualization offloading" may be used to describe a circuit board 202 because much of the work required to configure and manage compute instances running at a pre-assembled computer system may be offloaded to a circuit board 202, enabling a larger fraction of the computing and other resources of the pre-assembled computer system to be utilized for the compute instances and client applications running at the compute instances. In the embodiment depicted in FIG. 5, code and data of a number of virtualization management component programs (e.g., software and/or firmware) may be stored locally on memory of the circuit board 202 or at SSDs 114 connected via SATA connector 112. The code and data may be run using the processors/cores 218/220. In at least some embodiments, individual ones of the virtualization management components may be executed using respective subsets of the available cores/processors—e.g., one of the cores may be used for an embedded operating system, another for a network interface card emulator, and so on.

At least a portion of the code resident in the memories of circuit board 202 and SSDs 114 may be used to manage various aspects of networking and storage for compute instances launched at the pre-assembled computer system, and may therefore be referred to as a combination of a networking manager and a storage manager. Note that at least in some embodiments, at least a portion of the code and/or data may be dynamically updated or modified, e.g., after one or more compute instances have been launched at the pre-assembled computer system using the code and data.

External Ethernet port 208 of circuit board 202 may connect RJ45 circuitry of virtualization offloading card 202 to a system management processor. The system management processor, may be responsible for tasks such as monitoring the physical state of the pre-assembled computer system, providing results of such monitoring, rebooting/restarting of the pre-assembled computer system when needed, and so on. Small form-factor circuitry 210, linked to one or more SFP ports, may be used to access a substrate network of a cloud computing service in at least some embodiments.

One or more types of local persistent storage devices may be incorporated within the virtualized offloading component 202 in some embodiments, such as NVME (non-volatile memory express) device(s), other (non-NVME) solid state drives (SSDs) accessible from SATA (Serial Advanced Technology Attachment) circuitry of the circuit board(s) 202, and so on. In at least some embodiments, storage manager code running at the circuit board 202 may use the local persistent storage devices to configure root volumes and/or other logical storage devices for compute instances instantiated at the pre-assembled computer system. In some embodiments, the storage manager code may implement block-level device interfaces locally (in effect implementing a subset of the functionality of a block storage service). In other embodiments, the storage manager may access a block storage service (and/or other network-accessible storage services) of the provider network to configure at least some storage devices.

Any of various computer systems may be configured to implement processes associated with a technique for multi-region, multi-primary data store replication as discussed with regard to the various figures above. FIG. 6 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 6 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for a migration tool as indicated at 2026, for the downloadable software or provider network are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data packets from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 6 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. An integrated circuit device, comprising:
a first circuit;
a second circuit; and
at least one data path between the first circuit and the second circuit;
wherein the first circuit includes:
a plurality of processor circuits, the processor circuits being configured to cycle between a low power mode and an active mode; and
a communication fabric coupled between the processor circuits and the at least one data path;
wherein the second circuit includes:
an input/output (I/O) data port;
a memory access circuit coupled to the I/O port; and
a wake-up management circuit coupled between the memory access circuit and the at least one data path, wherein the wake-up management circuit is configured to:
receive a data packet from the memory access circuit;
generate at least one wake-up signal for at least one processor circuit based on the data packet having a destination address associated with the at least one processor circuit; and
provide the at least one wake-up signal to the at least one processor circuit through the communication fabric.

2. The device of claim 1, wherein the wake-up management circuit includes a plurality of destination address windows, wherein a specified destination address window in the plurality of destination address windows corresponds to the at least one processor circuit, and wherein the wake-up management circuit is configured to:
receive the data packet in the specified destination address window when the data packet includes the destination address associated with the at least one processor circuit;
generate a wake-up signal for the at least one processor circuit in response to receiving the data packet in the specified destination address window; and
provide the wake-up signal to the at least one processor circuit through the communication fabric.

3. The device of claim 2, wherein the specified destination address window is configured to receive data packets having multiple destination addresses associated with the at least one processor circuit.

4. The device of claim 1, wherein the second circuit further includes a logger circuit, wherein the logger circuit includes a plurality of logger windows, wherein a specified logger window in the plurality of logger windows corresponds to the at least one processor circuit in the plurality of processor circuits, and wherein the second circuit is configured to:
receive, at the logger circuit, the data packet in the specified logger window based on the destination address in the data packet;
transmit, by the logger circuit, a wake-up flag for the at least one processor circuit in response to receiving the data packet in the specified logger window;
generate, at the wake-up management circuit, wake-up metadata for the at least one processor circuit in response to receiving the wake-up flag; and
provide the wake-up metadata to the at least one processor circuit through the communication fabric.

5. The device of claim 1, wherein the at least one processor circuit is configured to switch from the low power mode to the active mode in response to receiving the at least one wake-up signal.

6. An integrated circuit device, comprising:
a network data port; and
a wake-up management circuit coupled between the network data port and a plurality of processor circuits, the processor circuits being configured to cycle between a low power mode and an active mode, wherein the wake-up management circuit is configured to:
receive a data packet from the network data port, the data packet including an address associated with a specified processor circuit in the plurality of processor circuits; and
provide a wake-up signal to the specified processor circuit based on the address in the received data packet.

7. The device of claim 6, wherein the wake-up management circuit includes a plurality of address windows, wherein a specified address window in the plurality of address windows corresponds to the specified processor circuit, and wherein the wake-up management circuit is configured to:
route the data packet to the specified address window based on the data packet having the address associated with the specified processor circuit;
generate the wake-up signal for the specified processor circuit in response to receiving the data packet in the specified address window; and
provide the wake-up signal to the specified processor circuit.

8. The device of claim 7, wherein the wake-up management circuit includes an address determination circuit configured to route the data packet to the specified address window based on the data packet having the address associated with the specified processor circuit.

9. The device of claim 7, wherein the wake-up management circuit is configured to route the data packet to the specified address window when the data packet includes one of multiple different addresses associated with the specified processor circuit.

10. The device of claim 6, further comprising a logger circuit coupled between the network data port and the wake-up management circuit, wherein the logger circuit includes a plurality of logger windows, wherein a specified logger window in the plurality of logger windows corresponds to the specified processor circuit, and wherein the logger circuit is configured to:
receive the data packet in the specified logger window based on the address in the data packet; and transmit, to the wake-up management circuit, a wake-up flag for the at least one processor circuit in response to receiving the data packet in the specified logger window;

wherein the wake-up management circuit is configured to:
generate wake-up metadata for the at least one processor circuit in response to receiving the wake-up flag; and
add the wake-up metadata to the wake-up signal provided to the specified processor circuit.

11. The device of claim 10, wherein the wake-up signal is appended to the data packet.

12. The device of claim 10, wherein the wake-up signal is provided to the specified processor circuit independent of the data packet.

13. The device of claim 6, wherein the data packet includes a header followed by data content, the header including the address, and wherein the wake-up signal is provided to the specified processor circuit before data content is completely received by the specified processor circuit.

14. The device of claim 6, wherein the wake-up management circuit is configured to inhibit additional wake-up signals being sent to the specified processor circuit for a specified time period after the wake-up signal is provided to the specified processor circuit.

15. The device of claim 6, wherein the wake-up management circuit is configured to identify a source of the data packet and provide information on the source of the data packet to the specified processor circuit.

16. The device of claim 6, wherein the data packet includes data content to be written to the specified processor circuit or instructions to read data content from the specified processor circuit.

17. A method, comprising:
receiving, at a wake-up management circuit, a data packet from a network data port, the data packet including an address associated with a specified processor circuit in a plurality of processor circuits, wherein the processor circuits are configured to cycle between a low power mode and an active mode; and
providing, by the wake-up management circuit, a wake-up signal to the specified processor circuit based on the address in the received data packet.

18. The method of claim 17, further comprising:
routing the data packet to a specified address window in the wake-up management circuit based on the data packet having the address associated with the specified processor circuit, wherein the wake-up management circuit includes a plurality of address windows with the specified address window in the plurality of address windows corresponding to the specified processor circuit;
generating the wake-up signal for the specified processor circuit in response to receiving the data packet in the specified address window; and
providing the wake-up signal to the specified processor circuit.

19. The method of claim 17, further comprising:
receiving the data packet in a specified logger window in a logger circuit, the logger circuit being coupled between the network data port and the wake-up management circuit, wherein the logger circuit includes a plurality of logger windows, and wherein the specified logger window in the plurality of logger windows corresponds to the specified processor circuit;
generating, by the wake-up management circuit, wake-up metadata for the specified processor circuit in response to receiving the data packet in the specified logger window; and
adding, by the wake-up management circuit, the wake-up metadata to the wake-up signal provided to the specified processor circuit.

20. The method of claim 17, further comprising:
identifying, at the wake-up management circuit, a source of the data packet; and
providing information on the source of the data packet to the specified processor circuit.

* * * * *